United States Patent
Kao et al.

(10) Patent No.: US 7,451,147 B1
(45) Date of Patent: Nov. 11, 2008

(54) FLEXIBLE ENCRYPTION SCHEME FOR GSO TARGET PASSWORDS

(75) Inventors: I-Lung Kao, Round Rock, TX (US); Shaw-Ben Shepherd Shi, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1352 days.

(21) Appl. No.: 09/442,694

(22) Filed: Nov. 18, 1999

(51) Int. Cl.
*G06F 17/30* (2006.01)
*H04L 9/00* (2006.01)

(52) U.S. Cl. .......................... 707/9; 707/101; 707/102; 707/103 Y; 707/104.1; 713/156; 713/187

(58) Field of Classification Search .............. 713/151, 713/153, 156, 187; 707/5, 9, 101, 102, 103 Y, 707/104.1; 380/259, 277
See application file for complete search history.

(56) References Cited

U.S. PATENT DOCUMENTS

| | | | | |
|---|---|---|---|---|
| 5,226,172 A | * | 7/1993 | Seymour et al. | 709/222 |
| 5,241,594 A | * | 8/1993 | Kung | 713/151 |
| 5,611,048 A | * | 3/1997 | Jacobs et al. | 713/202 |
| 5,797,128 A | * | 8/1998 | Birnbaum | 707/5 |
| 5,822,434 A | * | 10/1998 | Caronni et al. | 713/156 |
| 5,917,912 A | * | 6/1999 | Ginter et al. | 713/187 |
| 5,933,501 A | * | 8/1999 | Leppek | 380/259 |
| 6,041,123 A | * | 3/2000 | Colvin, Sr. | 713/153 |
| 6,192,130 B1 | * | 2/2001 | Otway | 380/277 |

OTHER PUBLICATIONS

Microsoft Corporation, "The Windows Interface, An Application Design Guide," 1991, Microsoft Press, p. 3, pp. 75-77, and pp. 108-111.*
Manber, Udi, "A Simple Scheme to Make Passwords Based on One-Way Functions Much Harder to Crack," Nov. 1994, Computers and Security 15(2) (1996): p171-176.*
David Paul Maher, "Crypto Backup and Key Escrow", ACM, Mar. 1996, pp. 48-53.*
Rolf Oppliger, "Internet Security: Firewalls and Beyond", ACM, May 1997, pp. 92-102.*
Network Authentication Services: Global Sign On; Proposal for Implementation at the University of Connecticut; Computer Information Systems, University Computer Center, Nov. 1997; www.oralhistory.uconn.edu; pp. 1-5.
IBM Global Sing-On Version 2.0 support for IBM eNetwork Host On-Demand Version 3.0; www-4.ibm.com/software.network; pp. 1-3.
Tivioli Global Sign-On; www.tivoli.com/products/index/gso/; pp. 1-2.

* cited by examiner

*Primary Examiner*—Thuy N Pardo
(74) *Attorney, Agent, or Firm*—Duke W. Yee; Herman Rodriguez; Gerald H. Glanzman

(57) ABSTRACT

A method in a data processing system for providing security to target passwords in a global sign on system centralized database. In a preferred embodiment, a target password is received by the global sign on system. The target password is encrypted in a user selected encryption manner to create an encrypted password. The encrypted password and an indication of encryption manner chosen is then stored in the centralized database.

12 Claims, 5 Drawing Sheets

FLEXIBLE ENCRYPTION SCHEME FOR GSO TARGET PASSWORDS

CROSS REFERENCE TO RELATED APPLICATION

The present application is related to U.S. patent application Ser. No. 09/442,695 filed even date herewith, now issued as U.S. Pat. No. 6,556,995. The above mentioned patent applications are assigned to the assignee of the present invention. The content of the cross referenced application is hereby incorporated herein by reference.

BACKGROUND OF THE INVENTION

1. Technical Field

The present invention relates generally to the field of computer software and, more specifically, to methods of protecting users' passwords in a global sign on system.

2. Description of Related Art

As computers have infiltrated society over the past several decades and become more important in all aspects of modern life, more and more confidential information has been stored on computer databases. However, computers and networks such as the Internet allow multitudes of users to access databases. Many times multiple databases may be accessed via the same network, but not all users on the network need or should have access to every database. Therefore, security devices have been implemented to prevent unauthorized access to a database.

One method of preventing unauthorized access is to require the user to provide user identification information to verify that that user is entitled to the information contained in the database. Thus, many database applications require a user to provide identification information, such as a user ID and password, in order to access a protected database. These applications may have this information fixed within the application (i.e., "hard coded"), the application may be configured with the information, or, in some cases, the application may prompt the user for this information at run time.

However, databases are not the only computer resources requiring a user to provide identifying information. Other resources such as servers and networks may also require users to provide identifying information. Because different resources have different security requirements and because some resources assign identities rather than allowing a user to choose, many users may have multiple identities depending on the particular resource that they are accessing. The database identity is yet another one that the user must maintain.

Global Sign-on (GSO) technology manages this set of multiple identities on behalf of a user so that the user only needs to maintain a single user identity. The user then allows the GSO to manage the other identities automatically whenever the user attempts to access a particular protected resource. The GSO technology stores all of the user's passwords in a centralized database. However, since passwords are confidential, the GSO server uses a "master key" to encrypt the users passwords before it stores them and it uses the "master key" to decrypt the user's passwords after it retrieves them from the database and before it sends them to the GSO client.

The confidentiality of the "master key" is only protected by the Access Control List (ACL) on the machine where the GSO server is installed. Using a single master key ensures the confidentiality of the passwords in storage, but this has at least three disadvantages. First, a compromise of the server's master key will possibly lead to compromises of all the target passwords of all GSO users. Second, if the integrity of the master key is destroyed, all the users' passwords in the GSO database will not be useful. Third, if there is a requirement that the GSO databases be accessible by other applications, the users' passwords cannot be used by these applications due to the encryption protection. Therefore, a flexible encryption scheme for GSO target passwords and a method that supports this scheme in the existing GSO architecture is desirable.

SUMMARY OF THE INVENTION

The present invention provides a method in a data processing system for providing security to target passwords in a global sign on system centralized database. In a preferred embodiment, a target password is received by the global sign on system. The target password is encrypted in a user selected encryption manner to create an encrypted password. The encrypted password and an indication of encryption manner chosen is then stored in the centralized database. If an application requests the target password, the global sign on system retrieves the encrypted password and the indication of the encryption manner chosen to encrypt the target password from the centralized database. Using this information, the global sign on system decrypts the encrypted target password and supplies the requesting application with the unencrypted target password.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
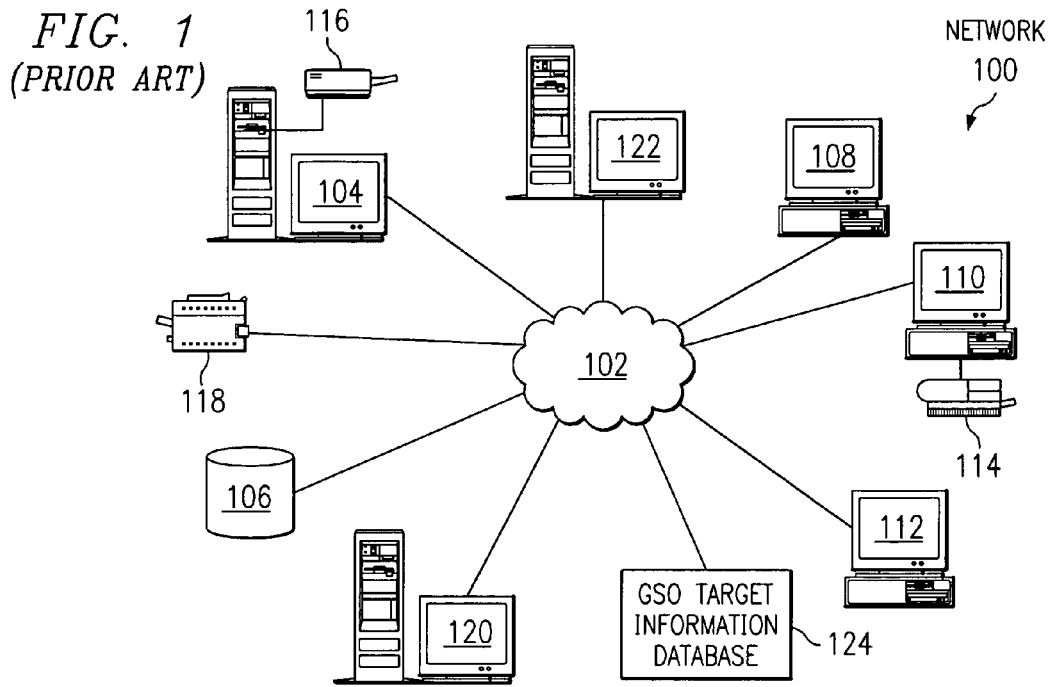
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104 and 122, Global Sign-On (GSO) Target Information Database 124, and GSO server 120 are connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108-112. Clients 108, 110 and 112 are clients to server 104. Distributed data processing system 100 may include additional servers, clients, and other devices not shown.

Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

GSO target information database 124 maintains a list of target passwords for individual users of network 100. When a user of a client, such as one of clients 108, 110, or 112, requests a service, an application, or information from a database from a target, which requires a password to access, a request for the appropriate user password is sent to GSO server 120. GSO server 120 retrieves the appropriate information from GSO target information database 124, decrypts the password (if the password has been encrypted), and passes the unencrypted password back to the requesting client. The requesting client then sends the request along with the password to the target to access a service, application, or database. In this way, a user of network 100 is only required to remember one password in order to "log on" to network 100. If any other passwords or user information is required by an application, service, or database, those passwords are stored in GSO target information database 124 in encrypted form until use of one of the target passwords is needed.

In the depicted example, distributed data processing system 100 is an intranet, with network 102 representing a worldwide collection of networks and gateways that use the TCP/IP suite of protocols to communicate with one another. At the heart of the intranet is a backbone of high-speed data communication lines between major nodes or host computers consisting of thousands of commercial, government, education, and other computer systems that route data and messages. Of course, distributed data processing system 100 also may be implemented as a number of different types of networks such as, for example, a local area network (LAN) or a wide area network (WAN).

FIG. 1 is intended as an example and not as an architectural limitation for the processes of the present invention.

Figure 2:
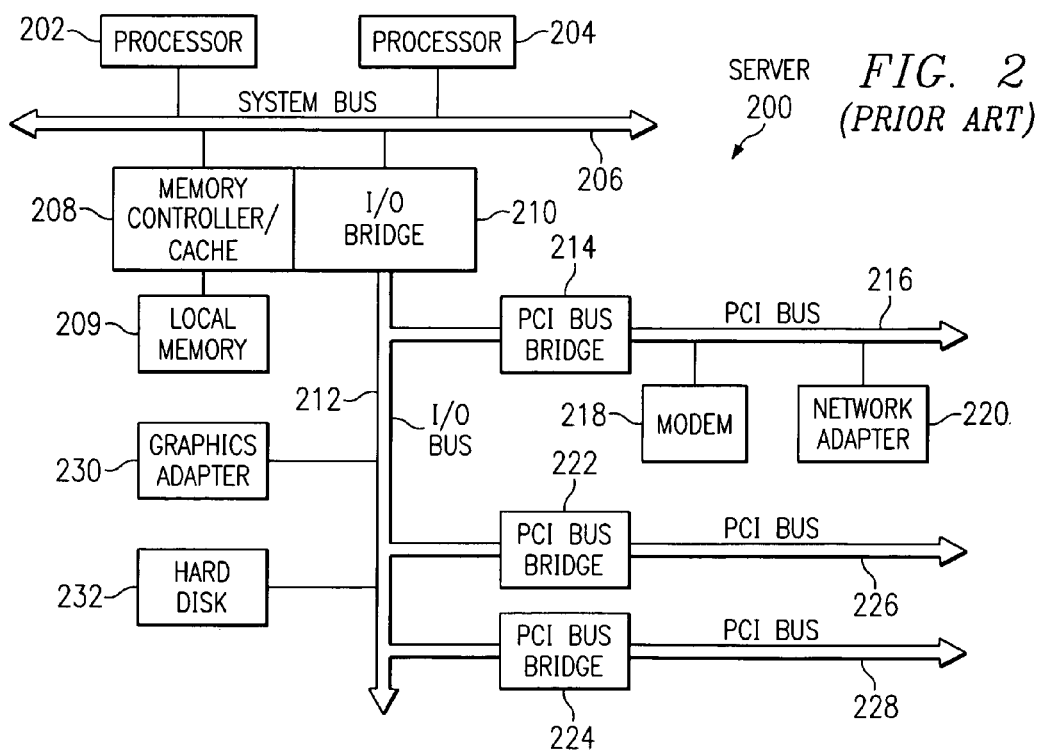
FIG. 2 depicts a block diagram of a data processing system which may be implemented as a server in accordance with the present invention.

Referring to FIG. 2, a block diagram of a data processing system which may be implemented as a server, such as one of servers 104, 120, and 124 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
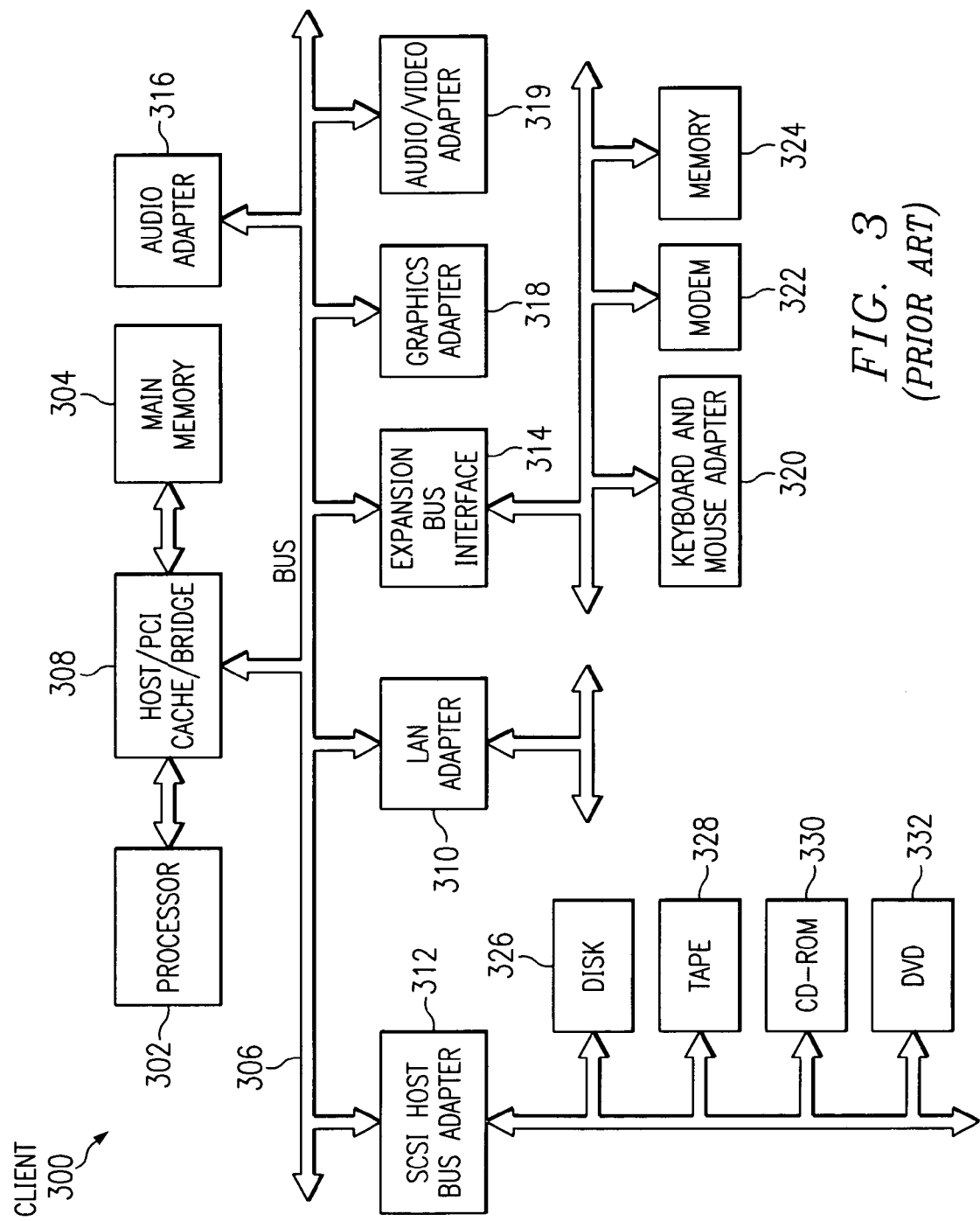
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer such as one of clients 108, 110, or 112. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
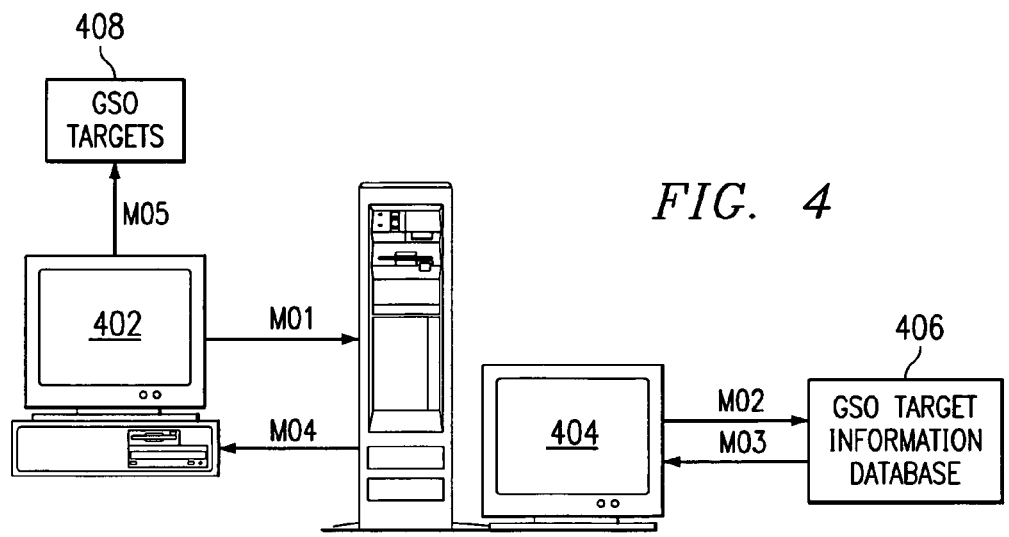
FIG. 4 depicts a block diagram illustrating message flow in accordance with a preferred embodiment of the present invention.

Referring now to FIG. 4, a block diagram illustrating message flow in accordance with a preferred embodiment of the present invention is depicted. GSO client 402 authenticates (step M01) itself (by sending a GSO user's GSO primary password) to GSO server 404 via a distributed computing environment (DCE) login and sends (step M01) a request to retrieve the user's target information from GSO target information database 406. GSO server 404 sends a request (step M02) to retrieve the GSO user's target information to GSO target information database 406. All GSO targets' passwords are encrypted in a user selected manner while they are stored in GSO target information database 406 (also known as a DCE Security Registry). A user selected manner means that the user has selected the encryption scheme or method to use to encrypt the target password and other target information. In the present example, the user selected manner may be one of three schemes: encrypted using a master key alone (option 1), encrypted using the user's primary password alone (option 2), or encrypted using both the user's primary password and the master key (option 3). Depending on the method chosen by the GSO user or by the GSO administrator, the GSO target information for a particular user and/or target may be encrypted using only the GSO server's master key, using the GSO user's GSO primary password, or with both in a specific order. Two flags are created and stored with each target password in GSO target information database 406. One of the flags indicates the password encryption option chosen by the GSO user and the other indicates the current encryption status of the target information stored within GSO target information database 406.

GSO target information database 406 sends (step M03) the GSO user's target information and flags back to GSO server 404. GSO server 404 then uses the current encryption status flag to determine which method of encryption was used to encrypt the target information stored in GSO target information database 406. If the target information was stored using only the master key, then GSO server 404 decrypts the target information using the master key. If the target information was stored using only the GSO user's GSO primary password, then GSO server 404 sends the target information to the GSO Client without any modification (because the target password will be decrypted with the GSO user's GSO primary password at the client side). If both the master key and the GSO user's GSO primary password were used to encrypt the target information, then GSO server 404 uses the master key to decrypt the target password first, and sends the target information to GSO client 402, and then GSO client 402 uses the GSO user's GSO primary password second to decrypt the target information at the client side.

GSO server 404 then sends (step M04) the GSO user's target information back to GSO client 402. Note that if option 1 was chosen, then the target information (including passwords) is clear, i.e., not encrypted, (except for the mandatory encryption of messages between devices in this example) when it is received by GSO client 402. However, if option 2 or option 3 were chosen, then the target information is sent still encrypted using the user's GSO primary password. GSO client 402 then uses the unencrypted target information received from GSO server 404 to log on (step M05) to the GSO user's GSO target 408.

When a GSO target is created at a GSO client 402 and sent to GSO server 404, if option 1 or 3 is chosen, GSO server 404 encrypts the target password using the GSO master key before it sends the target information to GSO target database 406. Note, that if option 3 were chosen, client 406 encrypts the target information using the user's GSO primary password before sending the target information to GSO server 404, where it is further encrypted using the GSO master key before being sent to target database 406. If option 2 is chosen, the target information is encrypted by client 402 before sending it to the GSO server 404, which then sends it to target database 406 without further encryption. As stated before, the GSO user has three options for encrypting the target information. The GSO user may choose to encrypt the target information using only the master key (option 1), using only the GSO user's GSO primary password (option 2), or using both the GSO primary password first and the master key second (option 3). Once, the method has been chosen and GSO server 404 encrypts the target information, the encrypted target information along with flags indicating the current encryption status and password encryption option chosen is sent to GSO target information database 406 to be stored until needed by the GSO user.

When a new target password (or other GSO target information) is created for a GSO user by the GSO administrator, if option 1 has been chosen by the GSO user previously, then GSO server 404 encrypts the newly created target password using the master key and stores it as well as both flags, which indicate password encryption option and current encryption status are both master key only, in GSO target information database 406. If, however, the GSO user has selected one of the other encryption options which require the use of the GSO user's GSO primary password for encryption, then GSO server 404 must perform additional steps than would be performed if only using the master key for encryption.

For example, suppose GSO user has previously selected option 2, because the administrator does not have the GSO user's primary password, the master key will be temporarily used to encrypt the target password (this is important to ensure the confidentiality of the target password at any time), the "password encryption option" flag will be set to 2, and the "current encryption status" flag will be set to 1 by GSO server 404. When the GSO user attempts to retrieve the target password later, GSO server 404 (since the GSO primary user password is now available to GSO server 404) will find that the two flags ("password encryption option" and "current encryption status") do not match. GSO 404 will first decrypt the target password with its master key and send it to GSO client 402.

GSO client 402 will then use the target password to access GSO targets 408 and will also encrypt the target password with the GSO user's primary password and send the newly encrypted password to GSO server 406, which will reset the "current encryption status" flag to 2 and send the encrypted target password and "current encryption status" flag value to GSO target information database 406 for storage. It should be noted that GSO server 404 will attempt to make both flags synchronized (if they are not synchronized yet) the first time the target password is retrieved by the user, before any other GSO operations can be performed on the target password.

Similar processing will be performed by GSO client 402 and server 404 if the target password is updated either by the GSO user or by the GSO administrator. If the target password is updated by the GSO administrator and the password encryption option is set to 2 or 3, then GSO server 404 must encrypt using option 1 and set "current encryption status" to 1 and set "password encryption option" to 2 or 3 depending on that selected by the GSO user. GSO server 404 will then synchronize the two flags as described above the first time the GSO user attempts to retrieve the target password.

If the master key is changed by a GSO administrator, all GSO user's target passwords encrypted by the first and third options will be decrypted with the old master key and re-encrypted with the new master key, performed by GSO server 404. The target passwords encrypted by the second option will not be affected by this operation.

When the GSO user changes the GSO user's GSO primary password, all of that GSO user's target passwords encrypted by the second and third options will be decrypted with the old primary password and re-encrypted with the new primary password, an operation performed by GSO client 402. The target passwords encrypted by the first option will not be affected by this operation.

If the second or third encryption option is chosen to encrypt the user's target passwords, the user's primary password needs to be cached in client machine 402 at least for the duration of the user's sign-on. If there is a concern about the security of storing the user's password (even encrypted) in the local machine, a variation of the method discussed above can be employed. In this variation, a hash value of the user's primary password is obtained and used to encrypt the user's target passwords. When a user signs on to GSO, this password hash value is generated by GSO client 402 based on the user's primary password and is sent to GSO server 404 and cached in GSO server 404. In this variation, GSO server 404 will perform all the encryption/decryption work on behalf of GSO client 402 since it has the encryption key (the password hash) locally. In other words, all the work originally performed by GSO client 402 using the user's primary password is now performed by GSO server 404 using the user's password hash. The cached password hash will be purged when the user signs off from GSO by sending a message from GSO client 402 to GSO server 404 before the GSO sign-off operation is performed.

In the depicted example, message flows M01-M04 are based on Authenticated RPC, which means the target information is protected (i.e., encrypted) while it flows between GSO client 402 and GSO server 404 and between GSO server 404 and GSO target information database 406. However, Authenticated RPC is a separate encryption system from the present invention and is only used to encrypt messages passing between devices. The encryption scheme of the present invention provides for encrypting a GSO user's GSO target information for purposes of storing the encrypted information on GSO target information database 406, thus preventing access to the GSO user's target information if unauthorized access to GSO target information database 406 is obtained by someone. Message flow M05 is based on each target's specific protocol.

Figure 5:
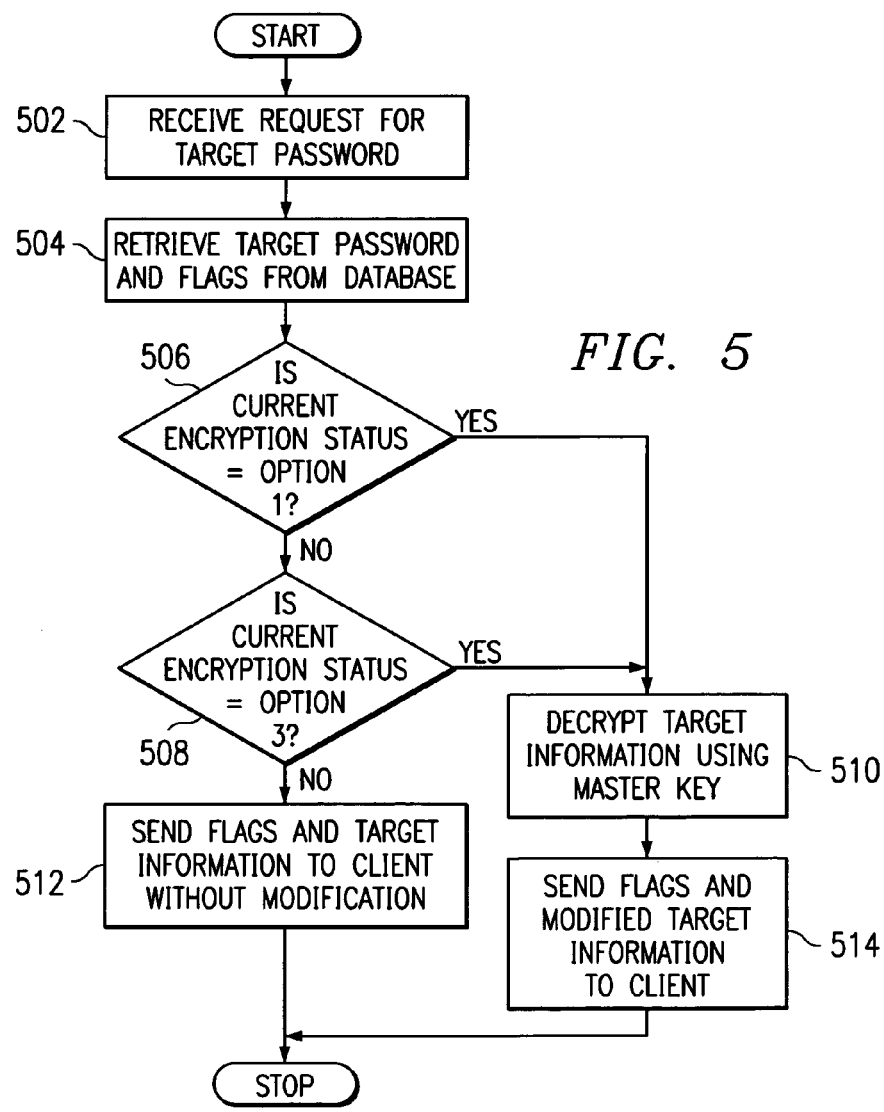
FIG. 5 depicts a flowchart illustrating a process of decrypting target user information as performed on a GSO server in accordance with the present invention.

Referring now to FIG. 5, a flowchart illustrating a process of decrypting target user information as performed on a GSO server is depicted in accordance with the present invention. To start, GSO server 404 receives a request for a target password from GSO client 402 (step 502). GSO server 404 retrieves the target password and associated flags from GSO target information database 406 (step 504). GSO server 404 then determines whether the "current encryption status" flag is set to option 1 (step 506). If the "current encryption status" flag is set to option 1, then the target information is decrypted using the master key (step 510). If the "current encryption status" flag is not set to option 1, then GSO server 404 determines whether the "current encryption status" flag is set to option 3 (step 508). If the "current encryption status" flag is set to option 3, then decrypt the target information using the master key (step 510) as before. Once step 510 is performed, the associated flags and decrypted target information is sent to the client (step 514) where the client may decrypt the target information further if option 3 has been selected.

If the "current encryption status" flag is not option 3 (i.e., it is option 2), then GSO server 404 sends the flags and target information unmodified to GSO client 402 (step 512), which will then decrypt the target information. After completion of either step 512 or step 514, the process ends.

Figure 6:
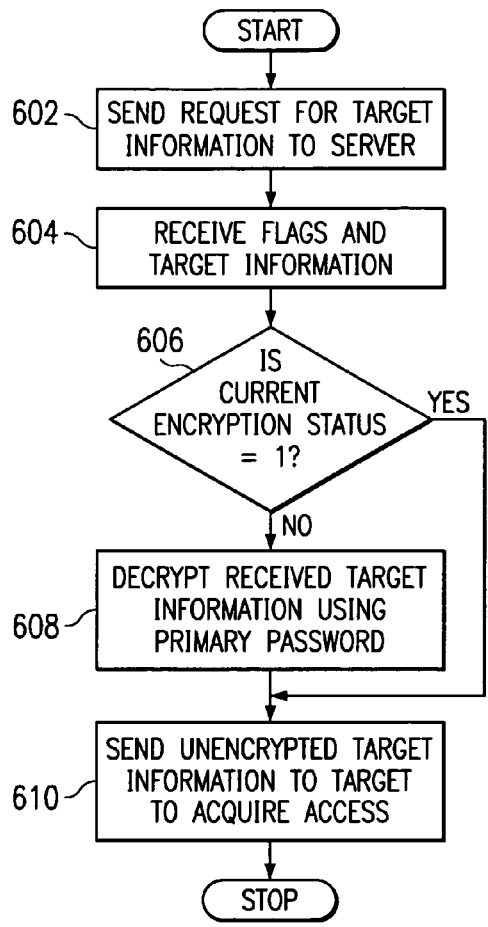
FIG. 6 depicts a flowchart illustrating a process of decrypting target information from the perspective of a GSO client in accordance with the present invention.

Referring now to FIG. 6, a flowchart illustrating a process of decrypting target information from the perspective of a GSO client is depicted in accordance with the present invention. To start, GSO client 402 sends a request for target information to GSO server 404 (step 602). GSO client 402 then receives the target information and associated flags from GSO server 404 (step 604). GSO client 402 then determines if the "current encryption status" flag is set to option 1 (step 606). If the "current encryption status" flag is set to option 1, then the target information is completely decrypted and no further decryption need be performed by client 402. Thus, client 402 sends the decrypted target information, without modification, to GSO target 408 to acquire access to the target service, application, or database (step 610). If the "current encryption status" flag is not equal to 1 (i.e., it is option 2 or 3), then the received target information is decrypted using the GSO user's GSO primary password (step 608) thus producing decrypted target information and then the decrypted target information is sent to the target (step 610) and the decryption process ends.

Figure 7:
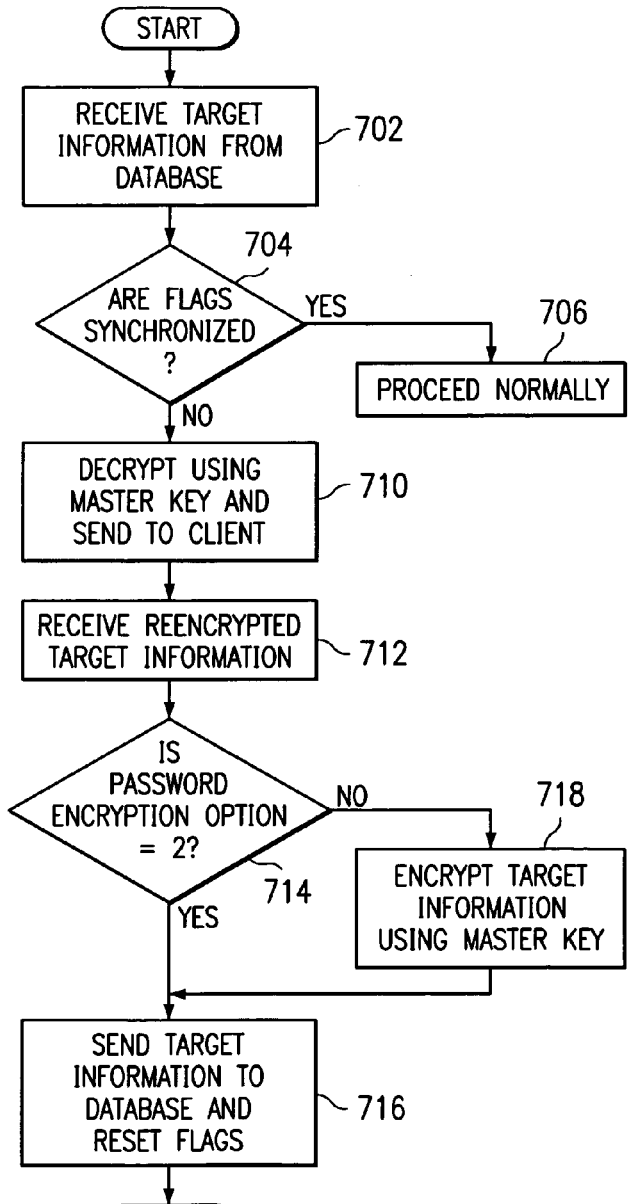
FIG. 7 depicts a flowchart illustrating a method a synchronizing the flags in a GSO target information database in accordance with the present invention.

Referring now to FIG. 7, a flowchart illustrating a method a synchronizing the flags in a GSO target information database is depicted in accordance with the present invention. To start, GSO server 404 receives target information from GSO target information database 406 as in step 504 in FIG. 5 (step 702). GSO server 404 determines whether the flags are synchronized (step 704). If the flags are synchronized, then the process proceeds as in step 506 in FIG. 5 (step 706). If the flags are not synchronized, then GSO server 404 decrypts the target information using the master key and sends the decrypted target information to client 402 (step 710). Note, that all target information passes through GSO server 404 before being stored in GSO target information database 406 and that GSO server 404 always has access to the master key. Therefore, the only time the "current encryption status" flag and the "password encryption option" flag will not match is when a user has selected option 2 or 3, but is not available to provide primary password encryption, thus requiring GSO server 404 to encrypt using the master key.

GSO server 404 then receives the reencrypted target information from client 402 which has encrypted the target information using the GSO user's primary password (step 712). GSO server 404 then determines whether the "password encryption option" flag is equal to option 2 (step 714). If the "password encryption option" flag is not equal to option 2, then the target information is further encrypted using the master key (step 718) and then the fully encrypted target information is sent to GSO target information database 406 for storage and the both flags are set to 3 (step 716). If the "password encryption option" flag is equal to 2, then GSO server 404 does no further encryption and the target information as received encrypted from GSO client 402 is sent unmodified to GSO target information database 406 and the both flags are set to 2 (step 716). The process of synchronization is now complete and the process ends.

Figure 8:
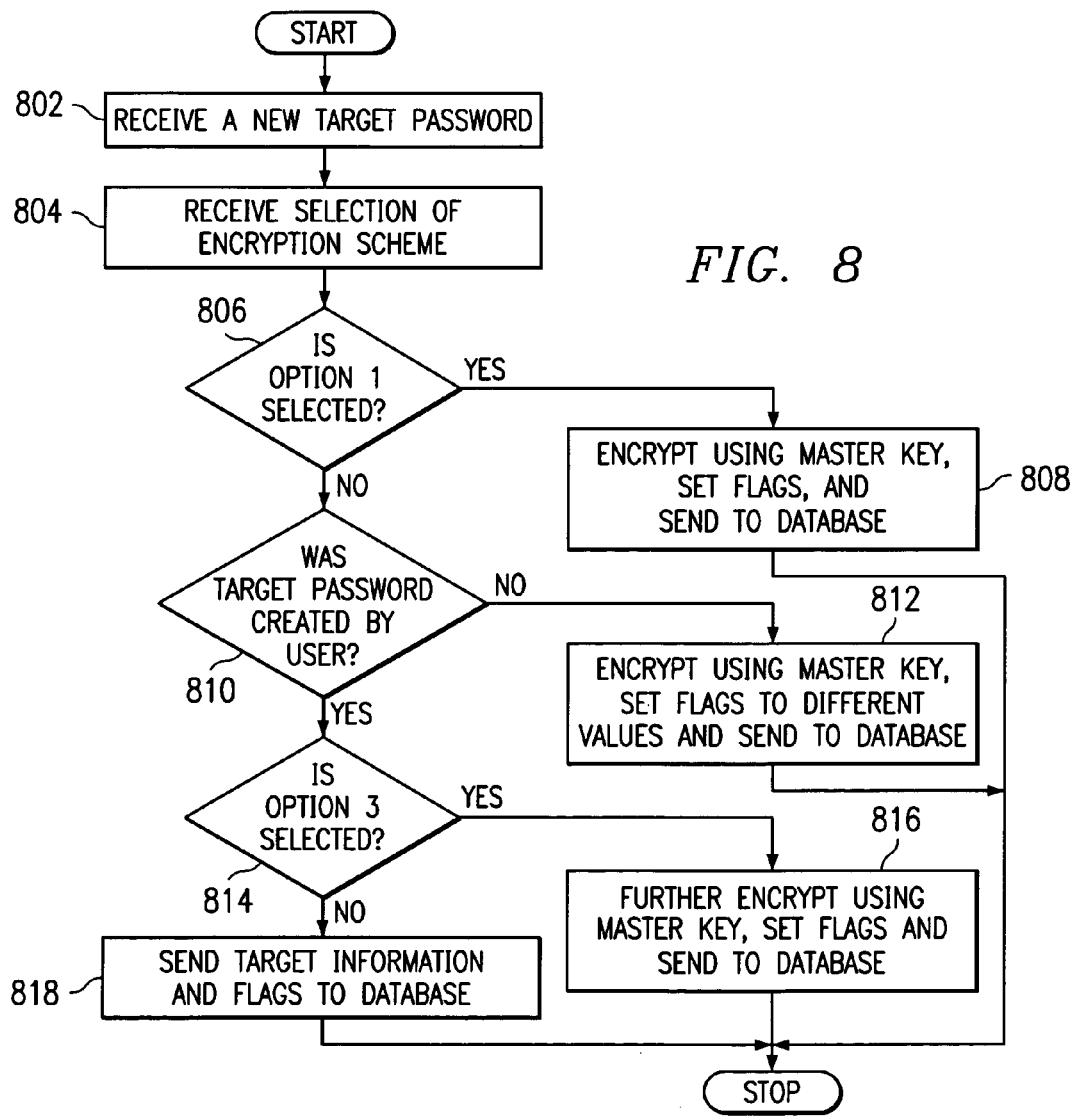
FIG. 8 depicts a flowchart illustrating a method of encrypting a new target password in accordance with the present invention.

Referring now to FIG. 8, a flowchart illustrating a method of encrypting a new target password is depicted in accordance with the present invention. To start, GSO server 404 receives a new target password (step 802). GSO server 404 also receives a selection of encryption scheme (step 804). The encryption scheme might have been preselected by a GSO user or may be selected at the time the new target password is created.

Once the new target password and encryption scheme are received by GSO server 404, GSO server 404 determines whether option 1 has been selected (step 806). If option 1 has been selected, then the target information is encrypted using the master key, both flags are set to 1, and the flags and encrypted target information are sent to GSO target information database 406 for storage (step 808) at which point the process ends. If option 1 was not selected, then GSO server 404 determines whether the new target password was received from a GSO user or from a GSO administrator (step 810). If the new target password was received from a GSO administrator, then encrypt the target password using the master key, set the "current encryption status" flag to 1, set the "password encryption option" flag to the option selected (i.e., either 2 or 3), and send the unsynchronized flags and the encrypted target password to GSO target information database 406 for storage (step 812), thus ending the process.

If the new target password was received from a GSO user, then GSO server 404 determines whether option 3 has been selected (step 814). If option 3 is selected, then further encrypt (it has already been encrypted by GSO client 402 in this case) the target password using the master key, set the both flags to 3, and send both flags and the fully encrypted target password to GSO target information database 406 for storage (step 816), at which point the process ends. If option 3 is not selected, then set both flags to 2 and send both flags and encrypted target password as received from GSO client 402 to GSO target information database 406 for storage (step 818), at which point the process ends.

Although the present invention has been described primarily with reference to a GSO based database system, the present invention may be applied to other types of database systems as well. Moreover, the techniques described are also applicable to any other systems or applications which need to manage confidential data like passwords. Furthermore, more encryption options may be presented to the user as well with appropriate values placed for both flags.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing security to target passwords in a global sign on system centralized database, comprising the steps of:
   receiving a target password;
   encrypting said target password in a user selected encryption manner to create an encrypted password; and
   storing said encrypted password and an indication of encryption manner chosen, and further comprising:
   responsive to a determination that the user has changed a primary password from a first primary password to a second primary password:
   retrieving all of said users target passwords that were encrypted using said first primary password;
   decrypting all of said users target passwords that were encrypted using said first primary password to produce unencrypted target passwords;
   encrypting said unencrypted target passwords using said second primary password to produce reencrypted target passwords; and
   storing said reencrypted target passwords.

2. A method in a data processing system for providing security to target passwords in a global sign on system centralized database, comprising the steps of:
   receiving a target password;
   encrypting said target password in a user selected encryption manner to create an encrypted password; and
   storing said encrypted password and an indication of encryption manner chosen, and further comprising:
   responsive to a determination that a master key has been changed from a first master key to a second master key:
   retrieving all of said target passwords encrypted using said first master key;
   decrypting all of said target passwords encrypted using said first master key to produce unencrypted target passwords;
   encrypting said unencrypted target passwords using said second master key to produce reencrypted target passwords; and
   storing said reencrypted target passwords.

3. A method in a data processing system for accessing password protected information comprising the steps of:
   sending a request for target information to a server, wherein the target information is stored in an encrypted form on a database;
   receiving the target information from the server;
   responsive to a determination that the encrypted form is a second encrypted form, further decrypting the target information using a user's primary password to produce decrypted target information; and
   sending the decrypted target information to the target to acquire access to the target.

4. The method as recited in claim 3, wherein the second encrypted form uses only the user's primary password to encrypt the target information.

5. The method as recited in claim 3, wherein the second encrypted form uses both the user's primary password and a master key to encrypt the target information.

6. A computer program product in a data processing system, comprising:
a computer recordable medium storing computer usable program code for providing security to target passwords in a global sign on system centralized database, the computer program product comprising:
first instructions for receiving a target password;
second instructions for encrypting said target password in a user selected encryption manner to create an encrypted password; and
third instructions for storing said encrypted password and an indication of encryption manner chosen, and further comprising:
fourth instructions, responsive to a determination that the user has changed a primary password from a first primary password to a second primary password, for retrieving all of said users target passwords that were encrypted using said first primary password;
fifth instructions, responsive to said fourth instructions, for decrypting all of said users target passwords that were encrypted using said first primary password to produce unencrypted target passwords;
sixth instructions, responsive to said fifth instructions, for encrypting said unencrypted target passwords using said second primary password to produce reencrypted target passwords; and
seventh instructions, responsive to said sixth instructions, for storing said reencrypted target passwords.

7. A computer program product in a data processing system, comprising:
a computer recordable medium storing computer usable program code for providing security to target passwords in a global sign on system centralized database, the computer program product comprising:
first instructions for receiving a target password;
second instructions for encrypting said target password in a user selected encryption manner to create an encrypted password; and
third instructions for storing said encrypted password and an indication of encryption manner chosen, and further comprising:
fourth instructions, responsive to a determination that a master key has been changed from a first master key to a second master key, for retrieving all of said target passwords encrypted using said first master key;
fifth instructions, responsive to said fourth instructions, for decrypting all of said target passwords encrypted using said first master key to produce unencrypted target passwords;
sixth instructions, responsive to said fifth instructions, for encrypting said unencrypted target passwords using said second master key to produce reencrypted target passwords; and
seventh instructions, responsive to said sixth instructions, for storing said reencrypted target passwords.

8. A computer program product in a data processing system, comprising:
a computer recordable medium storing computer usable program code for accessing password protected information, the computer program product comprising:
first instructions for sending a request for target information to a server, wherein the target information is stored in an encrypted form on a database;
second instructions for receiving the target information from the server;
third instructions, responsive to a determination that the encrypted form is a second encrypted form, for further decrypting the target information using a user's primary password to produce decrypted target information; and
fourth instructions for sending the decrypted target information to the target to acquire access to the target.

9. The computer program product as recited in claim 8, wherein the second encrypted form uses only the user's primary password to encrypt the target information.

10. The computer program product as recited in claim 8, wherein the second encrypted form uses both the user's primary password and a master key to encrypt the target information.

11. A global sign on system, comprising:
means for receiving a target password;
means for encrypting said target password in a user selected encryption manner to create an encrypted password; and
means for storing said encrypted password and an indication of encryption manner chosen, wherein security is provided for said target passwords stored in a centralized database, and further comprising:
retrieving means, responsive to a determination that the user has changed a primary password from a first primary password to a second primary password, for retrieving all of said users target passwords that were encrypted using said first primary password;
decrypting means, responsive to said retrieving means, for decrypting all of said users target passwords that were encrypted using said first primary password to produce unencrypted target passwords;
encrypting means, responsive to said decrypting means, for encrypting said unencrypted target passwords using said second primary password to produce reencrypted target passwords; and
storing means, responsive to said encrypting means, for storing said reencrypted target passwords.

12. A global sign on system, comprising:
means for receiving a target password;
means for encrypting said target password in a user selected encryption manner to create an encrypted password; and
means for storing said encrypted password and an indication of encryption manner chosen, wherein security is provided for said target passwords stored in a centralized database, and further comprising:
retrieving means, responsive to a determination that a master key has been changed from a first master key to a second master key, for retrieving all of said target passwords encrypted using said first master key;
decrypting means, responsive to said retrieving means, for decrypting all of said target passwords encrypted using said first master key to produce unencrypted target passwords;
encrypting means, responsive to said decrypting means, for encrypting said unencrypted target passwords using said second master key to produce reencrypted target passwords; and
storing means, responsive to said encrypting means, for storing said reencrypted target passwords.

* * * * *